Dec. 27, 1955  A. V. L. C. DEBRIE  2,728,264
MECHANISM FOR THE EXTRARAPID DESCENT OF FILM
IN CINEMATOGRAPHIC APPARATUS
Filed Oct. 6, 1951  3 Sheets-Sheet 1
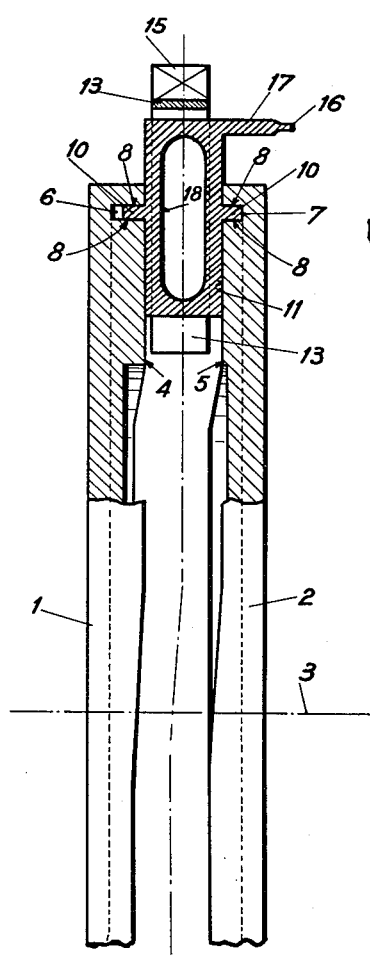
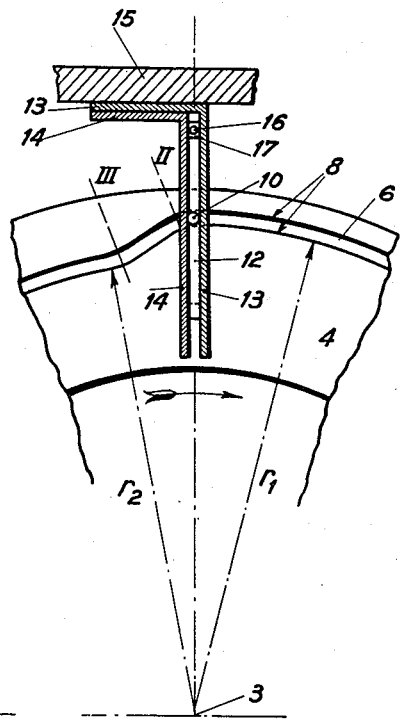
Inventor
Andre Victor Leon Clement Debrie
By Robert E Burns
Attorney

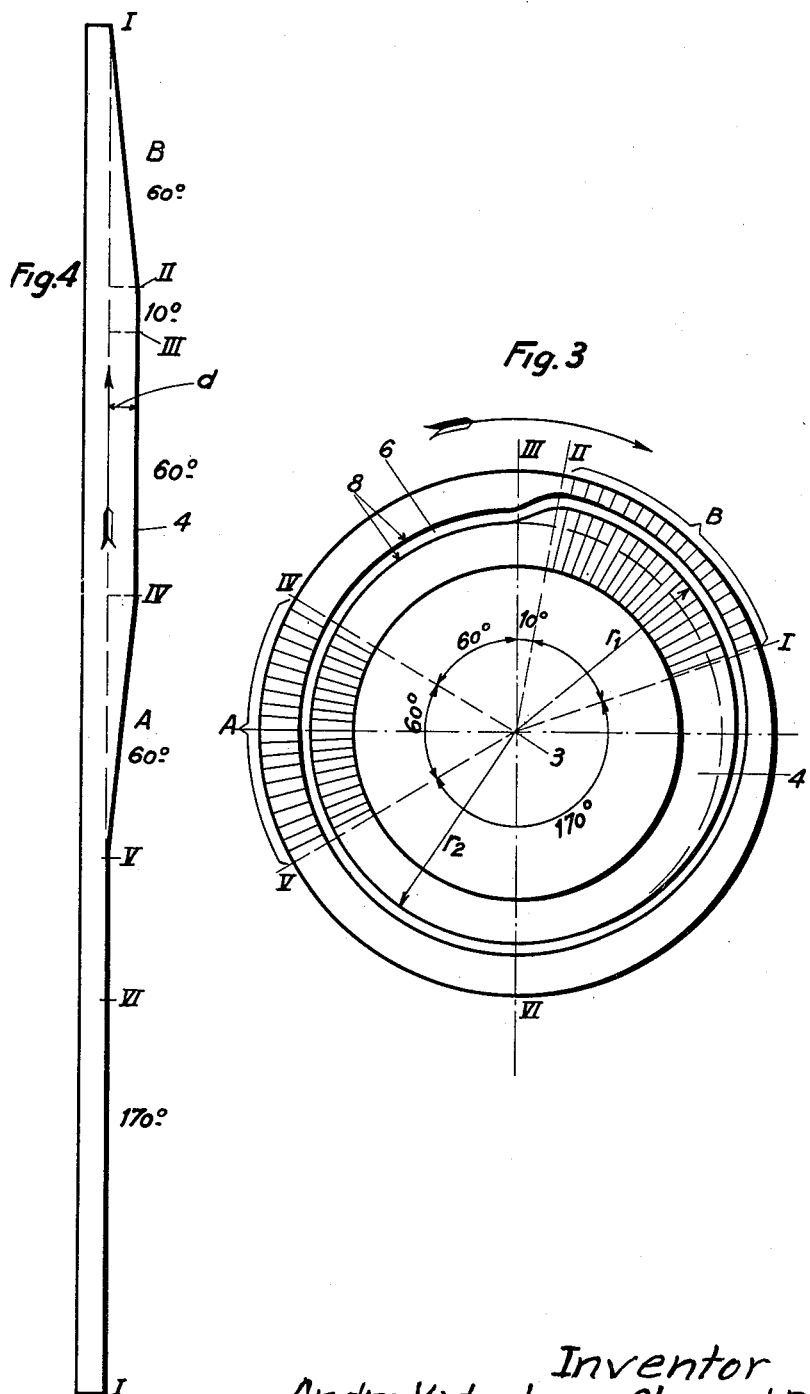

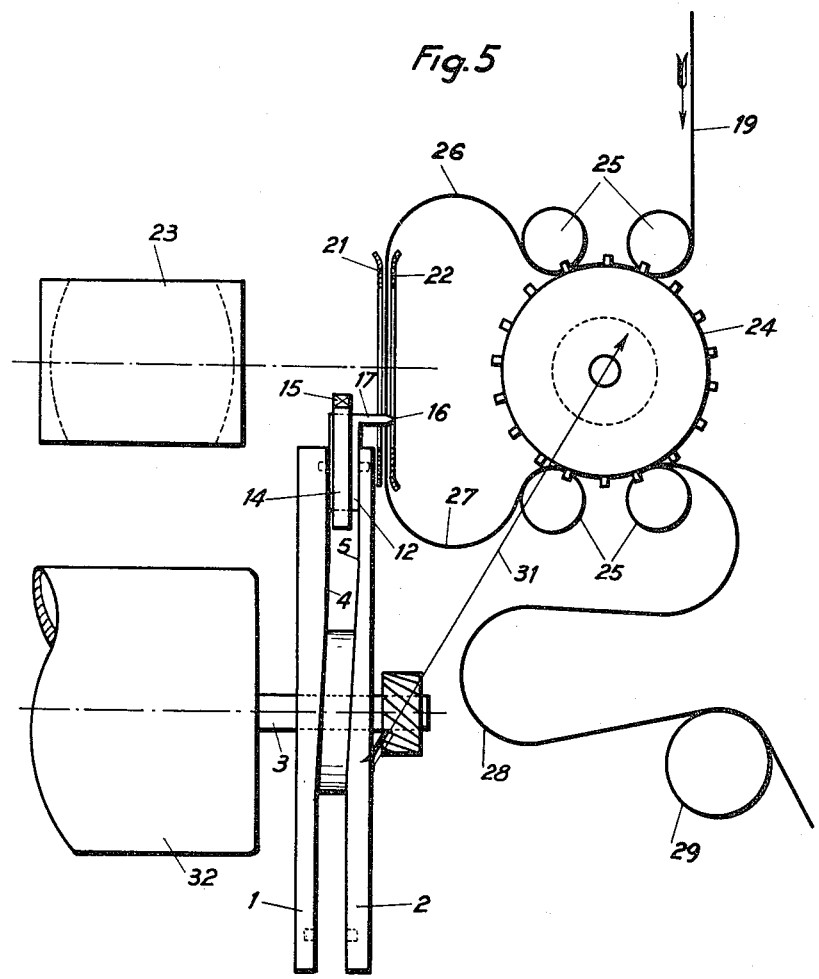

United States Patent Office 2,728,264
Patented Dec. 27, 1955

2,728,264

MECHANISM FOR THE EXTRARAPID DESCENT OF FILM IN CINEMATOGRAPHIC APPARATUS

André Victor Leon Clement Debrie, Paris, France

Application October 6, 1951, Serial No. 250,094

Claims priority, application France October 12, 1950

2 Claims. (Cl. 88—18.4)

It is sometimes necessary, in particular for telecinema wherein the image received upon the cathode screen is photographed to be retransmitted after a consecutive extra rapid development, to effect the descent of the film with extreme rapidity: In the case of telecinema, the descent of the film must be effected in a time shorter than that which is necessary for the rising of the luminous spot produced on the cathode screen by the scanning of the electron beam.

The usual film driving mechanisms hitherto employed are inconvenient because of high inertia of their moving parts.

The mechanism according to the present invention obviates this inconvenience because the claw carrying movable assembly is constituted by a very light thin metal sheet part whose light mass permits of getting a very large range of acceleration without developing prohibitive forces due to inertia. This assembly, moving in a plane between two stationary guides, is controlled by two conjugated cams which simultaneously impart to it the displacements, radial and parallel to its axis, that are necessary in order that the claw may execute its motions of penetration, descent, withdrawal and ascent, permitting a correct displacement of the film.

In order that the invention may be more clearly understood, the same will now be described with reference to the accompanying schematic drawings which show, by way of example, an embodiment thereof and in which:

Fig. 1 is a lateral view, partly in elevation and partly in radial section, with parts broken away, showing a form of film driving mechanism according to the present invention;

Fig. 2 is a face view, partly in section and partly in elevation, with parts broken away, showing one of the cam-discs, the movable plate and its stationary guide;

Fig. 3 is a face view in elevation, on a reduced scale, showing one of the cam-discs;

Fig. 4 is an explanatory diagram, illustrating a circumferential evolution of the cam-disc of Fig. 3; and Fig. 5 is a longitudinal elevational view illustrating the interrelations of the film feeding, driving and guiding elements in the case of a picture taking camera whose framework and other elements, extraneous to the present invention, are not shown.

These figures relate to an example of execution in which the descent of the film is effected through 10° of rotation of the driving cam.

The driving cam comprises two discs 1 and 2, of convenient dimensions, fixedly mounted on a common shaft 3.

In the opposite faces 4 and 5 are milled two grooves 6 and 7, respectively, whose sides 8, parallel to the shaft 3, are disposed on common cylinders, of radii varying according to a law of radial displacements corresponding to descents, immobilisation and ascents of the claw in the sense of displacement of the film.

The grooves 6 and 7 are respectively hollowed in faces 9 and 11 opposing each other in the two discs. These grooves 6 and 7 are constituted by circular segments which remain always at a same distance from one face to the other and are in planes intershifted in the sense of the shaft 3 and perpendicular to the axis of rotation for the portions: II, III, and V, I (Figs. 3 and 4), and for the other portions I, II and IV, V in oblique planes so as to make up the connections between I and II and IV and V. There is thus constituted a cam that attacks the parallel and radially disposed sides 9 and 11 of a rectangular small plate 12 guided so as to remain in a radial plane passing through the shaft 3, between two plane guides 13 and 14 rigidly secured to the apparatus frame 15, these guides 13 and 14 being sufficiently narrow, between the faces 4 and 5, to prevent them from contacting these faces.

Remaining constantly in contact with 4 or 5, the plate 12 is displaced parallelly to the shaft 3 when the cam-drum 1—2 is rotated, this displacement between I and II and IV and V being of amplitude $d$ (Fig. 4).

The plate 12 is provided, on the sides 9 and 11, with two cam followers 10 engaged into, and guided by the sides 8 of, the grooves 6 and 7, imparting to the plate 12 radial displacements of absolute value $(r_1-r_2)$, when they pass from II to III and from VI to I, for example.

The film driving claw 16, penetrating into the film perforations, is carried by an overhanging part 17 made integral with the plate 12.

In a general way, the plate 12, part 17, claw 16, followers 10 and one or more weight-reducing apertures 18 will be obtained by being cut out from a thin but strong metal sheet, so as to be as light in weight as possible.

The very low inertia of this drive then permits, for example, of employing a cam such as illustrated in Figs. 3 and 4, wherein, the claw 16 brought into the high position at I, the plate 12 is repelled by the face of the cam inclined at B so that the claw 16 penetrates into the perforation of the film stopped, by a move parallel to the shaft 3, the followers 10 being on a run of 60° between I and II where the groove radius is constant and equal to $r_1$. At II, the longitudinal displacement stops but the followers 10 are on a run of only 10°, between II and III, brought back from the groove of radius $r_1$ to the groove of radius $r_2$ between III and VI, in the course of 180°.

In contrast, the longitudinal displacement, zero in the course of 60°, from III to IV, takes place progressively, from IV to V, to remove the claw 16 from the film perforation.

From VI to I, the groove radius passes again progressively from $r_2$ to $r_1$, causing the claw 16 to move upwards out of any contact with the film, and the cycle recommences.

In Fig. 5 is schematically shown the disposition of the aforesaid drive mechanism in respect to the film guiding and driving elements in a picture taking camera.

Similar references denote similar parts hereinabove described. Denoted by reference 19 is the film guided between the outer and inner parts 21 and 22 of the picture taking aperture, behind the objective 23.

This film is driven by a sprocket 24 cooperating with guiding pressers 25; it forms loops 26, 27 and after forming a further loop 28 passes around a winding reel 29. The sprocket 24 is rotatably connected, in a known way schematically indicated by the arrow 31, with the shaft 3 of cam-drums, 1, 2 driven by the motor 32. The reel 29 is also rotatable by this motor, in a known way not shown.

Other camera-elements, forming no part of the present invention, are not shown for the sake of simplifying the drawing.

Without departing from the scope of the invention, changes may be made in the particular form and position of the parts of the film driving mechanism hereinabove described and shown.

What is claimed is:

1. A drive mechanism for effecting the extra-rapid descent of a film in a motion picture apparatus comprising a film-displacing claw carried by a thin, small rectangular plate, a stationary support guiding said plate for horizontal and vertical displacement in such manner that the plate remains constantly parallel to the displacement of the film and perpendicular to said film, said rectangular plate having two parallel sides guided between two spaced cam-discs jointly rotatable on a common axis displacing said plate perpendicular to the film by imparting to the plate displacements parallel to the axis of rotation of the cam-discs, said plate being provided on its two parallel sides with cam-followers slidably engaged into two corresponding cam-grooves of varying radii made on the opposite inner faces of said discs, the displacements parallel to said shaft causing the drive claw, rigid with said plate, to penetrate into, or withdraw from, perforations of the film handled, the action of said cam-grooves controlling the descent, stoppage and ascent of the claw.

2. In a film driving mechanism of the type described, two spaced discs rigidly mounted on a common rotatable shaft and provided, on their inner faces with two annular cam-grooves, respectively, having their side walls parallel to the axis of said shaft, said grooves being of varying radii; a stationary two-shank guide projecting radially into the space between said discs without contacting their inner faces; and a movable rectangular small plate loose between, and guided by, the two flat shanks of said guide, said plate being apertured to reduce its weight and one end of this plate being provided with the film driving claw, whereas the other end thereof is held, by its sides, in contact with one or the other of the said inner faces, said sides being formed with two cam-followers slidably engaged into the cam-grooves; the claw, followers and apertured plate being jointly cut out from a thin metal sheet to reduce their inertia to a very small value.

References Cited in the file of this patent

UNITED STATES PATENTS

| | | |
|---|---|---|
| 2,484,348 | Kellogg | Oct. 11, 1949 |
| 2,618,196 | Mitchell | Nov. 18, 1952 |